(12) United States Patent
Kupratis et al.

(10) Patent No.: US 11,530,635 B2
(45) Date of Patent: Dec. 20, 2022

(54) FLUID INJECTION SYSTEMS FOR GAS TURBINE ENGINES

(71) Applicant: UNITED TECHNOLOGIES CORPORATION, Farmington, CT (US)

(72) Inventors: Daniel B. Kupratis, Wallingford, CT (US); Neil Terwilliger, Meriden, CT (US); Gary Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 97 days.

(21) Appl. No.: 16/586,348

(22) Filed: Sep. 27, 2019

(65) Prior Publication Data

US 2020/0182113 A1    Jun. 11, 2020

Related U.S. Application Data

(60) Provisional application No. 62/778,006, filed on Dec. 11, 2018.

(51) Int. Cl.
*F01N 3/04* (2006.01)
(52) U.S. Cl.
CPC ..................... *F01N 3/04* (2013.01)
(58) Field of Classification Search
CPC ... F01N 3/04; F02K 3/06; F02C 3/305; F05D 2260/212; F05D 2270/16
See application file for complete search history.

(56) References Cited

U.S. PATENT DOCUMENTS

| 3,369,361 | A | * | 2/1968 | Craig | F02C 6/006 |
| | | | | | 60/39.5 |
| 3,701,255 | A | * | 10/1972 | Markowski | F23R 3/18 |
| | | | | | 60/762 |
| 3,799,249 | A | * | 3/1974 | Linhardt | F02C 6/18 |
| | | | | | 165/60 |
| 5,101,619 | A | * | 4/1992 | Morris | F02C 7/26 |
| | | | | | 60/778 |
| 5,119,626 | A | * | 6/1992 | Lardellier | F02C 3/067 |
| | | | | | 60/244 |
| 8,015,819 | B2 | | 9/2011 | Thomas | |
| 8,776,527 | B1 | | 7/2014 | Sokhey et al. | |
| 10,612,424 | B2 | * | 4/2020 | Lauzat | F22B 1/1815 |
| 10,655,475 | B2 | * | 5/2020 | Maguire | F02C 7/18 |

(Continued)

FOREIGN PATENT DOCUMENTS

WO    2006010200    2/2006
WO    2007091275    11/2006

OTHER PUBLICATIONS

European Patent Office, European Search Report dated May 12, 2020 in Application No. 19214975.5.

(Continued)

*Primary Examiner* — Anthony Ayala Delgado
(74) *Attorney, Agent, or Firm* — Snell & Wilmer L.L.P.

(57) ABSTRACT

A fluid injection system for a gas turbine engine may comprise a fluid injector configured to inject a fluid into an exhaust flow exiting a turbine section of the gas turbine engine. The fluid injector may be coupled to a turbine exit guide vane located at a forward end of an exhaust system of the gas turbine engine. The fluid may decrease a temperature of the exhaust flow exiting the turbine section and/or increase a thrust of the gas turbine engine.

18 Claims, 5 Drawing Sheets

(56) References Cited

U.S. PATENT DOCUMENTS

| | | |
|---|---|---|
| 2011/0005196 A1 | 1/2011 | Andersen |
| 2011/0239656 A1 | 10/2011 | Crume |
| 2017/0198635 A1* | 7/2017 | Subbarao .............. F01D 25/002 |
| 2017/0211474 A1 | 7/2017 | Sennoun |
| 2017/0239692 A1* | 8/2017 | Diwinsky ................. B08B 3/04 |
| 2017/0362939 A1* | 12/2017 | Roberts ................... F01D 5/005 |
| 2018/0017017 A1* | 1/2018 | Tomlinson ................ F02C 9/18 |
| 2019/0264582 A1* | 8/2019 | Hinders ............... H02K 7/1823 |

OTHER PUBLICATIONS

European Patent Office, European Office Action dated May 11, 2022 in Application No. 19214975.5.

\* cited by examiner

FLUID INJECTION SYSTEMS FOR GAS TURBINE ENGINES

CROSS REFERENCE TO RELATED APPLICATIONS

This application claims priority to, and the benefit of, U.S. Provisional Application Ser. No. 62/778,006, titled "FLUID INJECTION SYSTEMS FOR GAS TURBINE ENGINES," which was filed Dec. 11, 2018, and which is incorporated in its entirety herein for all purposes by reference.

FIELD

The present disclosure relates to gas turbine engines, and, more specifically, to fluid injection systems for gas turbine engines.

BACKGROUND

A gas turbine engine typically includes a fan section, a compressor section, a combustor section, and a turbine section. In general, during operation, air is pressurized in the fan and compressor sections and is mixed with fuel and burned in the combustor section to generate hot combustion gases. The hot combustion gases flow through the turbine section, which extracts energy from the hot combustion gases to power the compressor section and other gas turbine engine loads. The increase of a climb thrust of the gas turbine engine and/or the exhaust temperature associated with the climb thrust operating condition can be detrimental to the efficiency and/or operating life of the gas turbine engine.

SUMMARY

A fluid injection system of a gas turbine engine is disclosed herein. In accordance with various embodiments, the fluid injection system may comprise a fluid injector configured to inject a fluid into an exhaust flow exiting a turbine section of the gas turbine engine. The fluid injector may be located at an aft end of the turbine section of the gas turbine engine.

In various embodiments, a fluid supply tank may be fluidly coupled to the fluid injector, and a conduit may fluidly couple the fluid supply tank to the fluid injector. In various embodiments, the conduit may be located proximate a fan exit vane. In various embodiments, a heat exchanger may be thermally coupled to the conduit. In various embodiments, a fuel cell may be fluidly coupled to the fluid supply tank.

In various embodiments, a valve may be configured to regulate a flow of the fluid from the fluid injector. An electromechanical actuator may be operably coupled to the valve. A controller may be in operable communication with the electromechanical actuator. The controller may be configured to command the electromechanical actuator to actuate the valve to an open position during a take-off operating condition.

In various embodiments, the fluid injector may be coupled to a turbine exit guide vane located at the aft end of the turbine section.

A gas turbine engine is also disclosed herein. In accordance with various embodiments, the gas turbine engine may comprise a turbine and an exhaust system aft of the turbine. The exhaust system may comprise a throat and a primary nozzle located radially outward of the throat. A fluid injection system may be configured to inject a fluid into an exhaust gas exiting the turbine. The fluid injection system may comprise a fluid injector located at a forward end of the exhaust system.

In various embodiments, the fluid injector may be coupled to a turbine exit guide vane located at the forward end of the exhaust system.

In various embodiments, the fluid injection system may further comprise a conduit fluidly coupling a fluid supply to the fluid injector. In various embodiments, the conduit may be located proximate a fan exit guide vane located forward of the turbine. In various embodiments, a heat exchanger may be thermally coupled to the conduit. In various embodiments, the conduit may be located through a pylon mounted to the gas turbine engine.

In various embodiments, the fluid injection system may further comprise a fluid supply fluidly coupled to the fluid injector. In various embodiments, a fuel cell may be fluidly coupled to the fluid supply. In various embodiments, an aircraft thermal management system may be fluidly coupled to the fluid supply.

In various embodiments, the fluid injection system may further comprise a valve configured to regulate a flow of the fluid from the fluid injector. An electromechanical actuator may be operably coupled to the valve. A controller may be in operable communication with the electromechanical actuator. The controller may be configured to command the electromechanical actuator to actuate the valve to an open position during a take-off operating condition.

In accordance with various embodiments, a gas turbine engine may comprise a turbine section and a means for injecting a fluid into an exhaust gas exiting the turbine section.

In various embodiments, the fluid may be configured to decrease a temperature of the exhaust gas exiting the turbine section. In various embodiments, the means for injecting the fluid may be configured to inject the fluid at a turbine exit guide vane located at an aft end of the turbine section.

In various embodiments, the means for injecting the fluid may comprise a fluid injection nozzle coupled to the turbine exit guide vane and a fluid supply fluidly coupled to the fluid injection nozzle. In various embodiments, the gas turbine engine may further comprise a means for regulating a flow of the fluid from the injection nozzle.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity. Surface shading lines and/or cross-hatching may be used throughout the figures to denote different parts but not necessarily to denote the same or different materials.

As used herein, "aft" refers to the direction associated with the tail (e.g., the back end) of an aircraft, or generally, to the direction of exhaust of a gas turbine engine. As used herein, "forward" refers to the direction associated with the intake (e.g., the front end) of a gas turbine engine. The term "upstream" is used to refer to directions and positions located closer to a fluid source.

A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to references other than the engine central longitudinal axis.

Figure 1A:
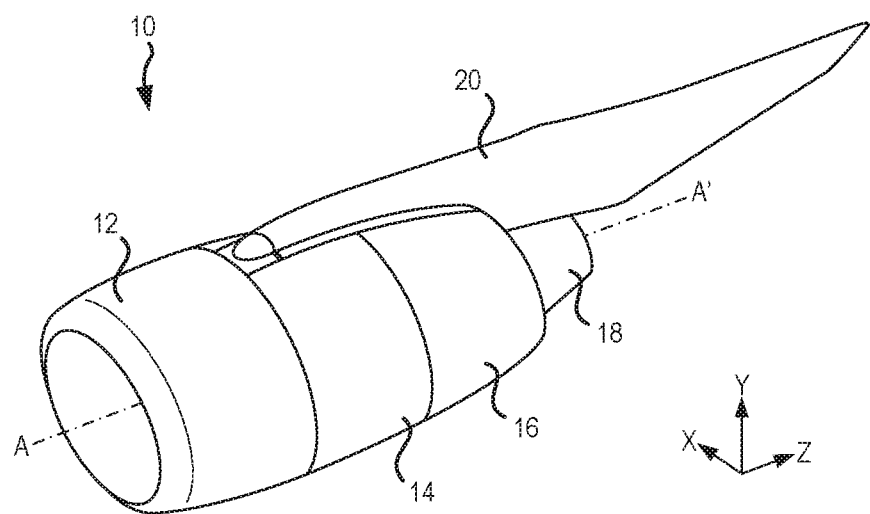
FIG. 1A illustrates a nacelle for a gas turbine engine, in accordance with various embodiments.

With reference to FIG. 1A, a nacelle 10 for a gas turbine engine is illustrated according to various embodiments. Nacelle 10 may comprise an inlet 12, a fan cowl 14, and a thrust reverser 16. Nacelle 10 may be coupled to a pylon 20. Pylon 20 may mount nacelle 10, and a gas turbine engine located within nacelle 10, to an aircraft wing or aircraft body. In various embodiments, an exhaust system 18 may extend from the gas turbine engine mounted within nacelle 10.

Figure 1B:
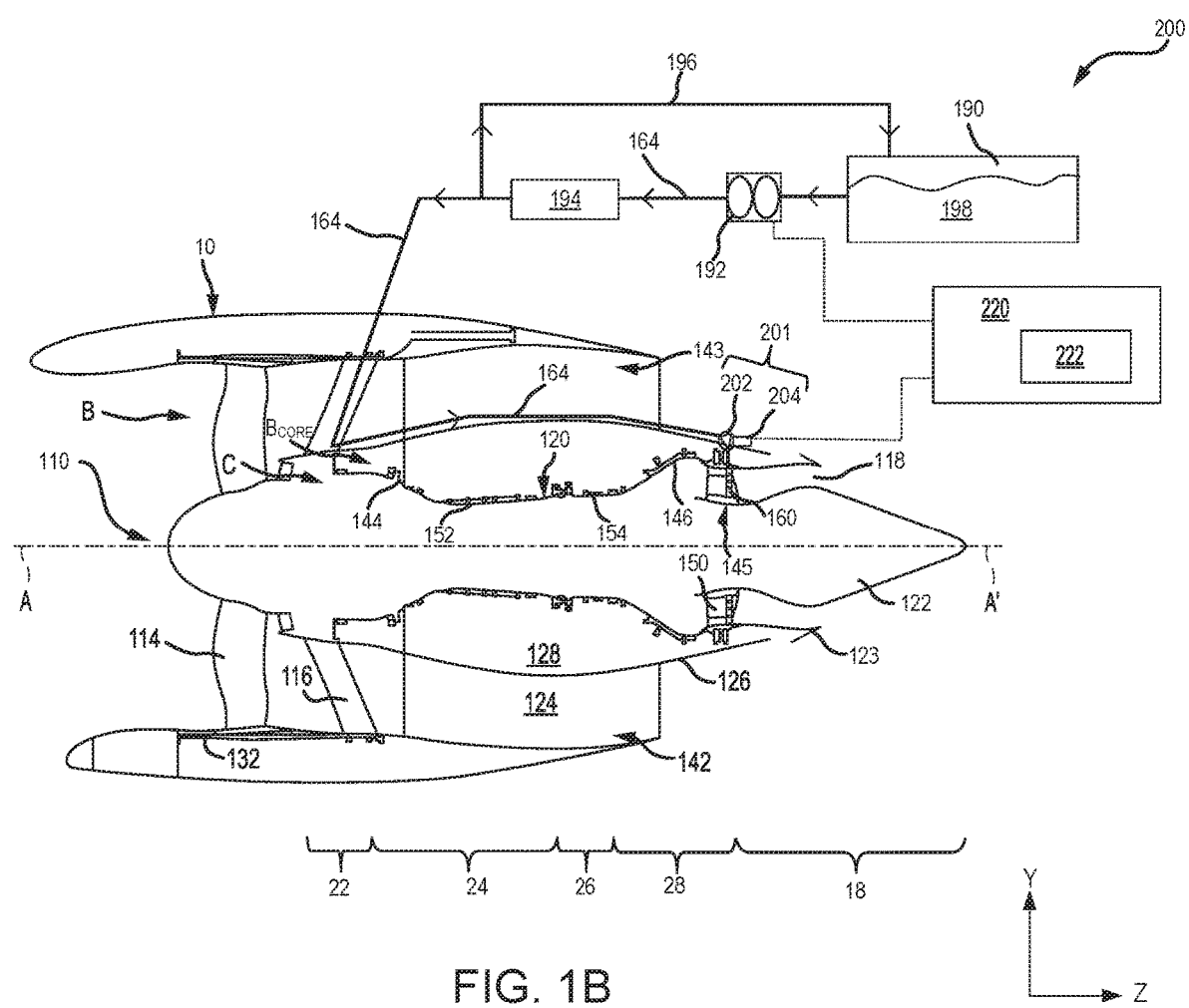
FIG. 1B illustrates a cross-sectional view of a gas turbine engine having a fluid injection system, in accordance with various embodiments.

FIG. 1B illustrates a cross-sectional view of a gas turbine engine 110 located within nacelle 10, in accordance with various embodiments. Gas turbine engine 110 may include a core engine 120. Core engine 120 may include an inlet section 22, a compressor section 24, a combustor section 26, and a turbine section 28. In operation, a fan 114 drives fluid (e.g., air) along a bypass flow-path B while compressor section 24 can drive air along a core flow-path C for compression and communication into combustor section 26 then expansion through turbine section 28. In various embodiments, core engine 120 generally comprises a low speed spool and a high speed spool mounted for rotation about an engine central longitudinal axis A-A'. Low speed spool may generally comprise a shaft that interconnects fan 114, a low pressure compressor 144, and a low pressure turbine 146. The high speed spool may comprise a shaft that interconnects a high pressure compressor 152 and high pressure turbine 154. A combustor may be located between high pressure compressor 152 and high pressure turbine 154. As used herein, a "high pressure" compressor or turbine experiences a higher pressure than a corresponding "low pressure" compressor or turbine. Although depicted as a turbofan engine 110 herein, it should be understood that the concepts described herein are not limited in use to turbofans as the teachings may be applied to other types of engines including turboprop and turboshaft engines. Although core engine 120 may be depicted as a two-spool architecture herein, it should be understood that the concepts described herein are not limited in use to two-spool gas turbine engines as the teachings may be applied to other types of engines including engines having more than or less than two spools.

Core engine 120 drives fan 114 of gas turbine engine 110. The airflow in core flow path C may be compressed by low pressure compressor 144 then high pressure compressor 152, mixed and burned with fuel in the combustor section 26, then expanded through high pressure turbine 154 and low pressure turbine 146. Turbines 146, 154 rotationally drive their respective low speed spool and high speed spool in response to the expansion. Bypass airflow B, driven by fan 114, flows in the aft direction through bypass flow path 124. At least a portion of bypass flow path 124 may be defined by nacelle 10 and an inner fixed structure (IFS) 126.

An upper bifurcation 143 and a lower bifurcation 142 may extend radially between the nacelle 10 and IFS 126 in locations opposite one another. Engine components such as wires and fluids, for example, may be accommodated in upper bifurcation 143 and lower bifurcation 142. IFS 126 surrounds core engine 120 and provides core compartment 128. Various components may be provided in core compartment 128 such as fluid conduits and/or compressed air ducts. For example, a portion $B_{CORE}$ of bypass airflow B may flow between core engine 120 and IFS 126 in core compartment 128. A fan case 132 may surround fan 114. Fan case 132 may be housed within nacelle 10. Fan case 132 may provide a mounting structure for securing gas turbine engine 110 to pylon 20, with momentary reference to FIG. 1A. According to various embodiments, one or more fan exit guide vanes 116 may extend radially between core engine 120 and fan case 132.

Exhaust system 18 is located aft of turbine section 28. Core airflow C flows through core engine 120 and is expelled through an exhaust outlet 118 of exhaust system 18. Exhaust outlet 118 may comprise an aerodynamic tail cone or "throat" 122. A primary nozzle 123 may be located radially outward of throat 122. Primary nozzle 123 and throat 122 may define exhaust outlet 118. Exhaust outlet 118 provides an exhaust path for core airflow C exiting turbine section 28 of core engine 120. A secondary nozzle may be located radially outward of primary nozzle 123. Primary nozzle 123 and the secondary nozzle may define an exit flow path for bypass airflow B exiting core compartment 128 and/or bypass flow path 124. A plurality of turbine exit guide vanes (TEGVs) 150 may be located circumferentially about engine central longitudinal axis A-A' and proximate an aft end 145 of low pressure turbine 146.

In accordance with various embodiments, gas turbine engine 110 includes a means for injecting a fluid, for example, water, into the exhaust at the aft end 145 of turbine section 28. For example, in various embodiments, gas turbine engine 110 may include a fluid injection system 200. Fluid injection system 200 provides a means for injecting fluid into the exhaust at TEGV 150. In this regard, fluid injection system 200 is configured to inject fluid into core airflow C exiting turbine section 28. Injecting fluid, and in particular, water, into the core airflow C exiting low pressure turbine 146 tends to decrease the temperature of the exhaust gas at TEGV 150, due to the injected fluid evaporating and cooling the exhaust gas. Decreasing the temperature of the gas tends to increase the flow rate, as the primary nozzle will match the flow parameter to the reduction in temperature. Thus, a greater exhaust flow can pass through exhaust outlet 118. The increase in flow through exhaust outlet 118 allows core engine 120 to increase flow (i.e., increase the flow rate of core airflow C). Increasing the flow rate of core airflow C increases the thrust of gas turbine engine 110, such that a greater thrust may be produced without increasing fuel input and/or exhaust temperature. In this regard, fluid injection system 200 may increase an efficiency of gas turbine engine 110. For example, tests have shown that a 1.0% of primary nozzle mass flow injection of water (i.e., injecting water at a flow rate that is 1% of the flow rate of core airflow C at TEGV 150) can reduce the flow parameter at primary nozzle 123 by 0.6%. Since the area of exhaust outlet 118 is constant, core engine 120 may increase flow rate by 0.6%, thereby increasing core power to drive fan 114. Fluid injection system 200 may also allow gas turbine engine 110 to produce the same amount of thrust, as compared to the engines without fluid injection, at lower exhaust temperatures. For example, tests have shown that a 1.0% of primary nozzle mass flow injection of water can reduce exhaust temperature by 10° Fahrenheit (5.5° Celsius) while producing approximately the same amount of thrust as compared to the same gas turbine engine without water injection. Decreasing engine temperature, tends to increase the operating life of the gas turbine engine.

Figure 2:
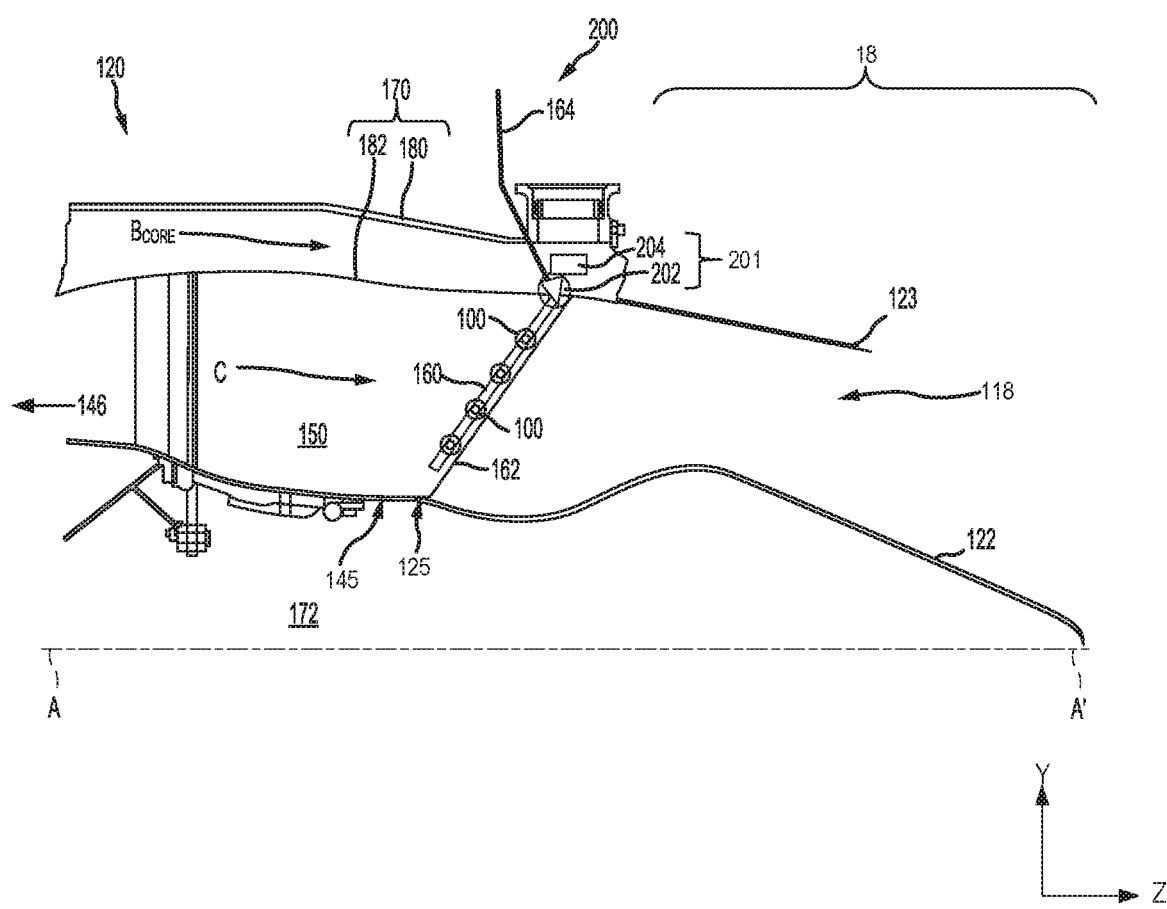
FIG. 2 illustrates a fluid injector coupled to a turbine exit guide vane, in accordance with various embodiments.

In accordance with various embodiments, fluid injection system 200 may include one or more fluid injectors 160 located at TEGVs 150. With reference to FIG. 2, a turbine exit guide vane (TEGV) 150 is illustrated, in accordance with various embodiments. TEGV 150 may be located at the aft end 145 of low pressure turbine 146. Stated differently, TEGV 150 may be at a forward end of throat 122 and primary nozzle 123 of exhaust system 18. TEGV 150 may extend generally radially between a turbine exhaust case (TEC) 170 and a center body 172 of core engine 120. TEC 170 may comprise an outer case 180 and a concentrically spaced inner liner 182. Outer case 180 may form a portion of IFS 126, with momentary reference to FIG. 1. Inner liner 182 may be located radially inward of outer case 180 and may operate as a heat shield to protect outer case 180 from the exhaust gas flow (e.g., core airflow C) through core engine 120. A flow path for, at least a portion of, bypass airflow $B_{CORE}$ may be defined in part by outer case 180 and inner liner 182.

In accordance with various embodiments, one or more of the TEGVs 150 may include at least one fluid injector 160 of fluid injection system 200. Fluid injector(s) 160 may be coupled to TEGV 150. In various embodiments, fluid injector(s) 160 may be located proximate an aft end 162 of TEGV 150. In this regard, fluid injector(s) 160 may be upstream, or at forward end 125, of exhaust system 18. Fluid injector 160 is fluidly coupled to a conduit 164. Conduit 164 may be radially outward from TEGV 150, such that fluid injector 160 extends radially inward from conduit 164. Multiple fluid injection nozzles 100 may be spaced along each fluid injector 160. Fluid injection nozzles 100 are configured to spray fluid, for example, water, into the exhaust gas exiting low pressure turbine 146.

Returning to FIG. 1B, conduit 164 may fluidly couple fluid injectors 160 to a fluid supply tank 190. In various embodiments, fluid supply tank 190 may be located onboard an aircraft (e.g., for example, in the wing and/or in the fuselage of an aircraft). In various embodiments, fluid supply tank 190 is a water tank. A pump 192 may be operably coupled to fluid supply tank 190. Pump 192 is configured to drive fluid 198 from fluid supply tank 190 to fluid injectors 160. In various embodiments, a heat exchanger 194 may be thermally coupled to conduit 164 and fluid 198. Heat exchanger 194 may be configured to prevent or decrease freezing of fluid 198. In various embodiments, a recirculation conduit 196 is configured to return a portion of the fluid 198 to fluid supply tank 190.

In various embodiments, at least a portion of conduit 164 may be located proximate a fan exit guide vane 116. For example, conduit 164 may be coupled to and/or located through fan exit guide vane 116. In various embodiments, a portion of conduit 164 may extend through pylon 20, with momentary reference to FIG. 1A. For example, conduit 164 may extend from TEGV 150, along IFS 126, and through fan exit guide vane 116 and pylon 20.

A valve assembly 201 may be fluidly coupled between conduit 164 and fluid injectors 160. Valve assembly 201 may provide a means for regulating a flow of fluid 198 from fluid injection nozzles 100, with momentary reference to FIG. 2. For example, valve assembly 201 may include a valve 202 that regulates the flow of fluid to fluid injectors 160. In this regard, when valve 202 is in an open position, fluid 198 can flow to fluid injectors 160. When valve 202 is in a closed position, fluid 198 is blocked or otherwise prevented from flowing to fluid injectors 160. In various embodiments, recirculation conduit 196 is configured to return, at least, a portion of the fluid 198 to fluid supply tank 190 to preclude "dead heading" pump 192 when valve 202 is in a closed position. Positioning of valve 202 between the open position and the closed position may also be employed to regulate a flow rate of fluid 198 to fluid injectors 160. For example, valve 202 may be positioned in a partially open position such that the volume of fluid 198 flowing to fluid injectors 160 per second with in valve 202 in the partially open position is greater than the volume of fluid 198 flowing per second with valve 202 in the closed position and less than the volume of fluid 198 flowing per second with valve 202 in the open position.

Valve assembly 201 further includes an electromechanical actuator (EMA) 204 operably coupled to valve 202 and configured to translate valve 202 between the open and closed positions. EMA 204 is operably coupled to a controller 220. Controller 220 is configured to command EMA 204 to actuate valve 202 to either the open position or the closed position. In various embodiments, controller 220 may determine whether valve 202 should be in the open position based on an operating condition of gas turbine engine 110. For example, controller 220 may command EMA 204 to actuate valve 202 to the open position during a take-off operating condition and may command EMA 204 to actuate valve 202 to the closed position during a cruise operating condition. Controller 220 may be configured to cause EMA 204 to actuate valve 202 to the open position in response to controller 220 determining the thrust of gas turbine engine should be increased (e.g., in response to receiving an increase thrust signal from the cockpit). In various embodiments, controller 220 may also be in operable communication with pump 192. In this regard, controller 220 may be configured to control pump 192 to control a flow rate of fluid 198 through conduit 164.

In various embodiments, controller 220 may comprise a full authority digital engine control (FADEC) system. Controller 220 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof. Controller 220 may include a memory 222. Memory 222 may store executable instructions and data to implement control logic of controller 220. Memory 222 may comprise a non-transitory, tangible computer-readable medium having instructions stored thereon that, in response to execution by the controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 3:
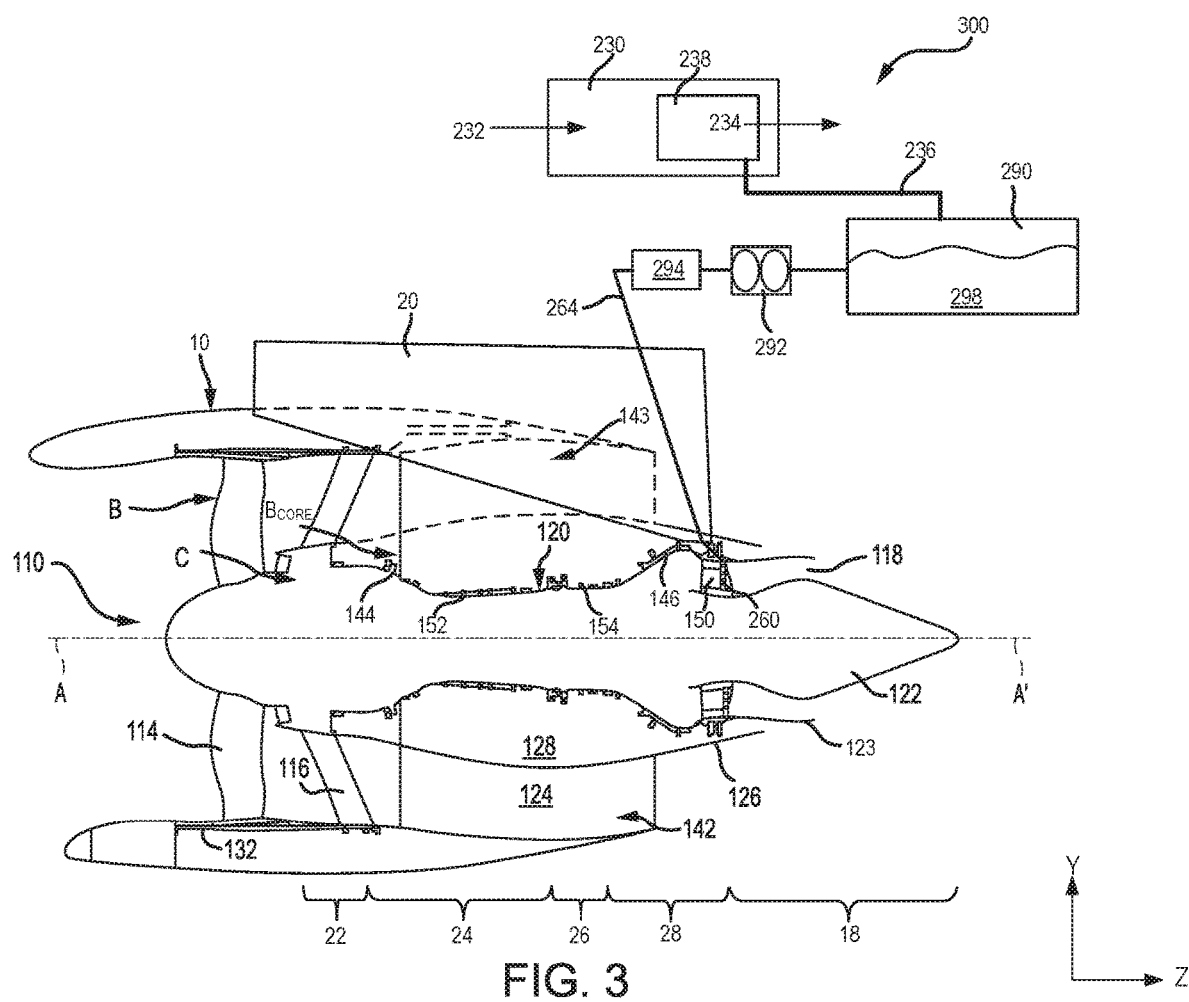
FIG. 3 illustrates a gas turbine engine having a fluid injection system coupled to an aircraft fuel cell, in accordance with various embodiments.

With reference to FIG. 3, a fluid injection system 300 comprising a fuel cell is illustrated, in accordance with in various embodiments. Fluid injection system 300 is similar to fluid injection system 200 in FIG. 1B and may replace fluid injection system 200 in gas turbine engine 110. Fluid injection system 300 provides a means for injecting fluid into gas exiting turbine section 28. As used herein, a means for injecting fluid into exhaust gas exiting turbine section 28 may generally include a fluid injection nozzle configured to spray fluid into the gas path at the aft end of a TEGV with the fluid injection nozzle being fluidly coupled, via a conduit, to a fluid supply and having a pump or the like configured to drive fluid from the fluid supply to the fluid injection nozzle.

Fluid injection system 300 includes a plurality of fluid injectors 260 coupled to TEGVs 150. A conduit 264 fluidly couples fluid injectors 260 to a fluid supply tank 290. In various embodiments, conduit 264 is located through pylon 20. For example, conduit may extend from fluid injectors 260, through IFS 126 and pylon 20, to fluid supply tank 290. A pump 292 is configured to drive a flow of fluid 298 from fluid supply tank 290 to fluid injectors 260. A heat exchanger 294 may be thermally coupled to conduit 264 between fluid supply tank 290 and fluid injectors 260.

Fluid injection system 300 may include a fuel cell 230. Fuel cell 230 may be located on board an aircraft. In various embodiments, fuel cell 230 comprises a hydrogen-oxygen fuel cell. Fuel cell 230 is configured to intake air 232. Fuel cell 230 includes an economizer 238 (i.e., a heat exchanger) configured to cool and condense the exhaust 234 produced by fuel cell 230. A fractional quantity ranging from zero to 100 percent of the condensed exhaust (i.e., water) is transferred to fluid supply tank via a conduit 236. Fuel cell 230 is thus configured to replenish fluid supply tank 290 during a flight, for example, during cruise.

Figure 4:
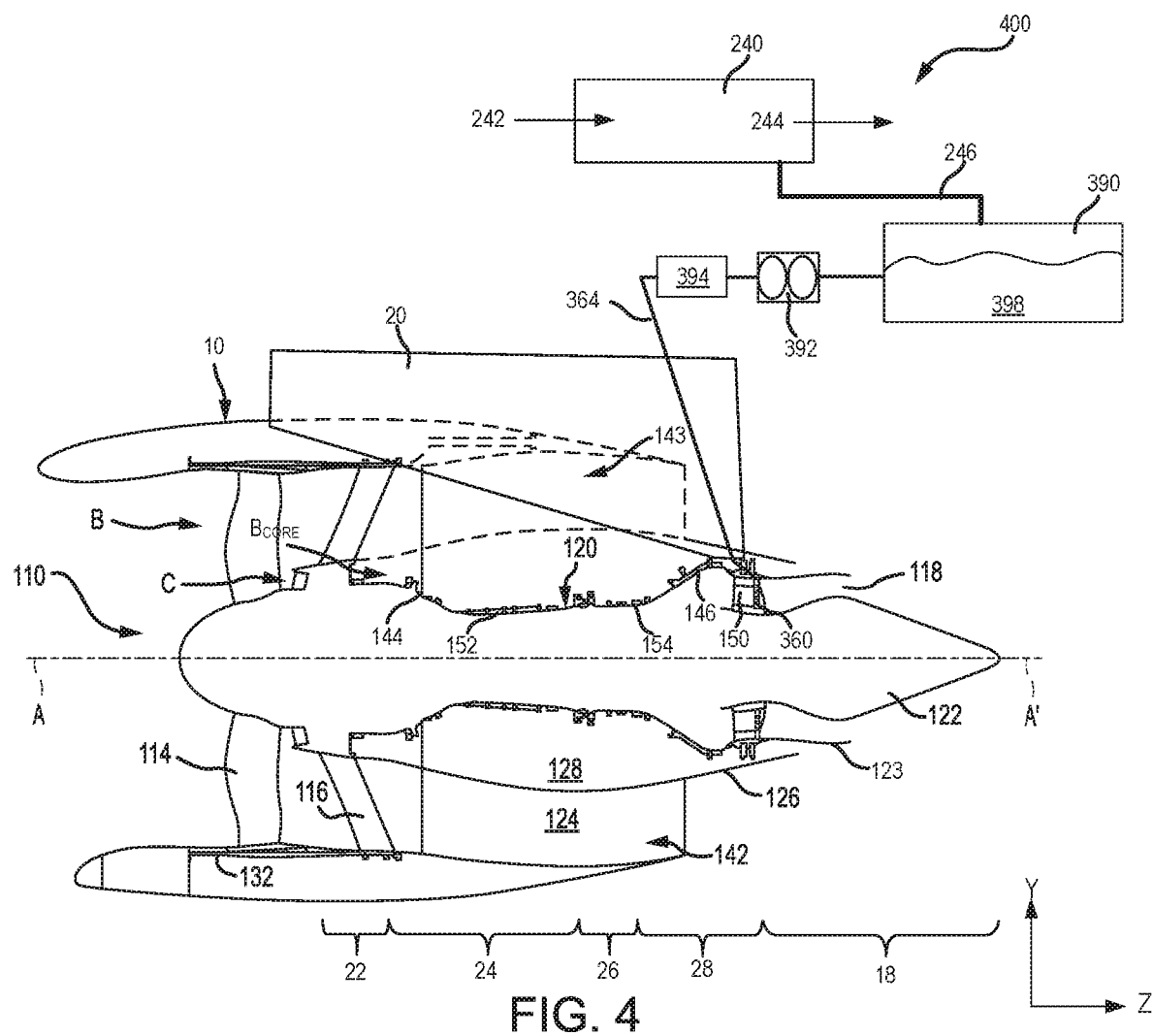
FIG. 4 illustrates a gas turbine engine having a fluid injection system coupled to an aircraft thermal management system, in accordance with various embodiments.

With reference to FIG. 4, a fluid injection system 400 comprising an engine power and thermal management system is illustrated, in accordance with in various embodiments. Fluid injection system 400 is similar to fluid injection system 200 in FIG. 1B and may replace fluid injection system 200 in gas turbine engine 110. Fluid injection system 400 provides a means for injecting fluid into gas exiting turbine section 28. Fluid injection system 400 includes a plurality of fluid injectors 360 coupled to TEGVs 150. A conduit 364 fluidly couples fluid injectors 360 to a fluid supply tank 390. In various embodiments, conduit 364 is located through pylon 20. A pump 392 is configured to drive a flow of fluid 398 from fluid supply tank 390 to fluid injectors 360. A heat exchanger 394 may be thermally coupled to conduit 364 between fluid supply tank 390 and fluid injectors 360.

Fluid injection system 400 may include an engine power and thermal management system 240. Engine power and thermal management system 240 may be configured to generate fluid 398 by condensing water vapor from atmospheric air. For example, engine power and thermal management system 240 may intake air 242 and remove water from the air (i.e., condense a fractional quantity ranging from zero to 100 percent of any water vapor in the intake air 242), and then output the air at outlet 244. Condensed water vapor (i.e., liquid water) is transferred to fluid supply tank 390 via a conduit 246. Engine power and thermal management system 240 is thus configured to replenish fluid supply tank 390 during a flight, for example, during cruise conditions.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fluid injection system of a gas turbine engine, comprising:
    a fluid injector configured to inject water into an exhaust flow exiting a turbine section of the gas turbine engine, wherein the fluid injector is coupled to an aft end of a turbine exit guide vane;
    a fluid supply tank fluidly coupled to the fluid injector;
    a conduit fluidly coupling the fluid supply tank to the fluid injector; and
    a heat exchanger thermally coupled to the conduit.
2. The fluid injection system of claim 1, wherein the conduit is located proximate a fan exit vane.
3. The fluid injection system of claim 1, further comprising a fuel cell fluidly coupled to the fluid supply tank.
4. The fluid injection system of claim 1, further comprising:
    a valve configured to regulate a flow of the water from the fluid injector;
    an electromechanical actuator operably coupled to the valve; and
    a controller in operable communication with the electromechanical actuator, wherein the controller is configured to command the electromechanical actuator to actuate the valve to an open position during a take-off operating condition.
5. The fluid injection system of claim 1, wherein the fluid injector includes a plurality of nozzles located along the aft end of the turbine exit guide vane.
6. A gas turbine engine, comprising:
    a turbine;
    an exhaust system aft of the turbine, the exhaust system comprising a throat and a primary nozzle located radially outward of the throat; and
    a fluid injection system configured to inject a fluid into an exhaust gas exiting the turbine, the fluid being configured to evaporate without combusting and decrease a temperature of the exhaust gas exiting the turbine, wherein the fluid injection system comprises a fluid injector having a plurality of nozzles coupled to an aft end of a turbine exit guide vane of the turbine, the turbine exit guide vane and the fluid injector being located at a forward end of the exhaust system.
7. The gas turbine engine of claim 6, wherein the fluid injection system further comprises a conduit fluidly coupling a fluid supply to the fluid injector, and wherein the conduit is located proximate a fan exit guide vane located forward of the turbine.
8. The gas turbine engine of claim 6, wherein the fluid injection system further comprises:
    a conduit fluidly coupling a fluid supply to the fluid injector; and
    a heat exchanger thermally coupled to the conduit.
9. The gas turbine engine of claim 6, wherein the fluid injection system further comprises a conduit fluidly coupling a fluid supply to the fluid injector, and wherein the conduit is located through a pylon mounted to the gas turbine engine.
10. The gas turbine engine of claim 6, wherein the fluid injection system further comprises:
    a fluid supply fluidly coupled to the fluid injector; and
    a fuel cell fluidly coupled to the fluid supply.
11. The gas turbine engine of claim 6, wherein the fluid injection system further comprises:
    a fluid supply fluidly coupled to the fluid injector; and
    an aircraft thermal management system fluidly coupled to the fluid supply.
12. The gas turbine engine of claim 6, wherein the fluid injection system further comprises:
    a valve configured to regulate a flow of the fluid from the fluid injector;
    an electromechanical actuator operably coupled to the valve; and
    a controller in operable communication with the electromechanical actuator, wherein the controller is configured to command the electromechanical actuator to actuate the valve to an open position during a take-off operating condition.
13. A gas turbine engine, comprising:
    a turbine section;
    an exhaust system aft of the turbine section, comprising a throat and a primary nozzle located radially outward of the throat, wherein a radially inward surface of the primary nozzle defines a portion of a first exhaust path for a core airflow, and wherein a radially outward surface of the primary nozzle defines a portion of a second exhaust path for a bypass airflow; and
    a means for injecting a fluid into the core airflow exiting the turbine section, wherein the fluid is configured to decrease a temperature of the core airflow exiting the turbine section upon the fluid being injected into the core airflow exiting the turbine section, such that the temperature of the core airflow exiting the turbine section is greater than a temperature of the core airflow at a forward end of the exhaust system.
14. The gas turbine engine of claim 13, wherein the fluid is water.
15. The gas turbine engine of claim 13, wherein the means for injecting the fluid is configured to inject the fluid at a turbine exit guide vane located at an aft end of the turbine section, and wherein the fluid is configured to evaporate without combusting upon being injected into the core airflow.
16. The gas turbine engine of claim 15, wherein the means for injecting the fluid comprises:
    a fluid injection nozzle coupled to the turbine exit guide vane; and
    a fluid supply fluidly coupled the fluid injection nozzle.

17. The gas turbine engine of claim 16, further comprising a means for regulating a flow of the fluid from the fluid injection nozzle.

18. A fluid injection system of a gas turbine engine, comprising:
  a fluid injector configured to inject water into an exhaust flow exiting a turbine section of the gas turbine engine, wherein the fluid injector is coupled to an aft end of a turbine exit guide vane;
  a valve configured to regulate a flow of the water from the fluid injector;
  an electromechanical actuator operably coupled to the valve; and
  a controller in operable communication with the electromechanical actuator, wherein the controller is configured to command the electromechanical actuator to actuate the valve to an open position during a take-off operating condition.

* * * * *